Patented Mar. 14, 1933

1,901,054

UNITED STATES PATENT OFFICE

MANVEL C. DAILEY, OF CHICAGO, ILLINOIS, ASSIGNOR TO UNITED STATES GYPSUM COMPANY, OF CHICAGO, ILLINOIS, A CORPORATION OF ILLINOIS

DENTAL MODEL STONE COMPOSITION

No Drawing.   Application filed August 10, 1931. Serial No. 556,336.

This invention relates to compositions of matter, and has reference more particularly to compositions suitable for use in mechanical dentistry, such as model stones used in forming metal plates, and as models in the manufacture of vulcanite, and other types of dentures.

In the manufacture of complete dentures for the mouth, it is common practice to take an impression of the mouth with some type of plastic impression material. Using the impression cast as a mold, a model is now cast from a dental stone composition which may consist of Keenes cement accelerated to give a fairly quick set or of mixtures of plaster-of-Paris with various ingredients added to improve strength, expansion characteristics, etc. The finished denture or metal dental plates may be formed over these models. In order to obtain fine detail the various types of denture materials are forced over the model under high pressure, hence it is necessary that model stones possess sufficient strength and hardness to successfully withstand this pressure. As certain types of dentures often comprise rubber compounds, the composition forming the models must withstand the action of high pressure steam commonly used in autoclaves by the dental profession for vulcanization of the rubber. It is also important that the composition has correct setting and thermal expansion properties.

An object of this invention, therefore, is to provide a composition of matter suitable for molding to form dental models, giving a product having high compressive and tensile strengths.

Another object of the invention is to provide a composition of the class described having correct expansion characteristics.

A further object of the invention is to provide a composition which sets rapidly to a hard cast having a high initial compressive strength and also a sufficiently high compressive strength after exposure to high pressure steam; also to improve compositions of matter in other respects hereinafter specified and claimed.

In the co-pending application of Randel and Dailey, Serial No. 384,343, filed August 9, 1929, and entitled "High strength calcined gypsum", a new high strength calcined gypsum is described, together with its method of manufacture. This high strength calcined gypsum has unique properties, in that its compressive and tensile strengths equal or exceed those of Portland cement, whereas its setting time is approximately that of ordinary plaster of Paris, viz., 15 to 30 minutes. The compressive strength of this product will range from 3500 to 6000 pounds per sq. in. at normal pouring consistency and it has a normal pouring consistency of less than 50 per cent.

Pouring or normal consistency is defined as that amount of water in cubic centimeters or grams, which, when mixed with 100 grams of dry stucco (plaster of Paris) will produce a mix of such consistency that it will just pour from a cup. This consistency figure is the same as percentage water based on weight of stucco and is so used in the specification and claims.

This new high strength calcined gypsum, which I shall in the future designate as "alpha gypsum", is manufactured according to the process fully described in the aforementioned co-pending application Serial No. 384,343, which comprises treating lumps of gypsum rock having a diameter of ½" to 2 in a closed container with steam at 17 to 20 pounds gauge pressure. This steam calcination is carried on for 4½ to 7 hours, with a constant steam pressure and with a constant withdrawal of water of condensation obtained from the heating steam, and also from the expelled water of crystallization. After calcination, the product is dried while maintaining a temperature close to 212 degrees F., and this product is ground so that 85 per cent of same passes through a 100 mesh screen.

Crystals of ordinary, first-settle, calcined gypsum as seen under the crossed nicols of a petrographic miscroscope, are very fine and needle-like. The crystals of alpha gypsum, however, under the same microscope appear rather short, thick, and well formed. These crystals of alpha gypsum are practically pure calcium sulphate hemi-hydrate, and under this microscope they appear brilliantly colored by reason of their being bi-refringent, while little or no color is seen in the case of the tiny, needle-like crystals of ordinary plaster-of-Paris. The unique properties of alpha gypsum have enabled me to prepare a new composition of matter suitable for use in the manufacture of dental model stones, this improved composition having very unusual properties. However, this alpha gypsum has certain disadvantages when used alone without other modifying ingredients, but by incorporating small amounts of various materials, the resulting composition has exactly the desired properties.

In the casting of models of the mouth, it is desirable that the model be of exactly the size and shape of the mouth from which it is made. Inasmuch as the setting expansion of neat alpha gypsum is in the order of 0.4 to 0.6 per cent on the consistency commonly employed by dentists, models prepared from the neat material are somewhat larger than the size of the mouth from which they are cast; also, they may be slightly distorted due to inequality of thickness over various parts of the model with consequent unequal expansion.

I have discovered that by the incorporation of 5% or less of Rochelle salt with the alpha gypsum, it is possible to reduce the setting expansion of the resulting composition from the figure as given to a range from 0.05 to 0.15%, depending upon the quantity of the Rochelle salts used. Also the alpha gypsum-Rochelle salt mixture, is not subject to as large dimensional change in the autoclave used for vulcanization of the rubber employed in the manufacturing of vulcanite dentures as is alpha gypsum alone, since there is very little expansion during vulcanization with the alpha gypsum—Rochelle salt mixture. The Rochelle salt also has some surface hardening effect on the set composition, while at the same time this salt does not appreciably affect the setting time of the composition.

The following formula is one which I have found to give excellent results when used for the manufacture of dental stone:

| | Per cent |
|---|---|
| Rochelle salt | 1–5 |
| Pigment | 0.5 |

Sodium citrate, as required to give desired setting time.

Alpha gypsum—balance.

For each 100 grams of the dry mixture, as given above, about 32 cc of water are added to bring this to a consistency commonly used for casting dental model stones. In the above formula, the pigment may be made up as follows:

| | Parts |
|---|---|
| Ferrite lemon yellow | 5 |
| Red iron oxide | 1 |
| Burnt sienna | 3 |

Almost any type of mineral pigment may be used to tint the stone to any desired shade.

The sodium citrate retarder is preferably dispersed or suspended on a finely ground inert material, such as silica, limestone or talc. The required amount of this suspension is mixed with the alpha gypsum to produce the desired time of set. In preparing this citrate suspension, the desired amount of citrate is dissolved in hot water and the solution is well mixed with the required amount of inert material, thus forming a pasty mass which is thoroughly dried and ground to a fine powder. A suspension of 10% sodium citrate with 90% of fine silica works well in practice. About 0.1% of the citrate suspension will produce a setting time of about 15–20 minutes in my model stone composition.

If desired, a portion of the Rochelle salt may be replaced in part by a cheaper chemical, viz. potassium sulphate. I prefer to limit the use of this potassium sulphate in amount, because it materially accelerates the setting time of the composition, requiring more sodium citrate as retarder to give the desired set. As much as 2% of this potassium sulphate may be used and as much as 5% of the Rochelle salt. Ground gypsum block may be used as an accelerator and commercial retarder may be used as a retarding agent to secure any desired setting time in the composition. Other accelerators and retarders known to the art may also be employed.

It should be understood that alpha gypsum may be used alone with water to produce a successful dental stone composition. The chief disadvantage in the use of the alpha gypsum alone is its expansion of setting so that accurate sized dentures are difficult to produce. However, for many purposes the alpha gypsum will be found satisfactory when used without other modifying ingredients.

The following figures will give a comparison between the properties of neat alpha gypsum and the improved composition as given by the formula above:

Compressive strength with 32% gauging water

| Dry | 1 hr. after casting |
|---|---|
| Neat alpha gypsum 8000 lbs. per sq. in. | 4000 lbs. sq. in. |
| Alpha gypsum—Rochelle salts mixture 7500 lbs. per sq. in. | 3900 lbs. sq. in. |

*Linear setting expansion*

| | |
|---|---|
| Neat alpha gypsum | 0.4 to 0.6% |
| Alpha gypsum—Rochelle salts composition | 0.05 to 0.15% |

*Compressive strength after exposure to saturated steam at 85 pounds pressure and at a temperature of 310° F. for three hours*

| | |
|---|---|
| Neat alpha gypsum | 230 lbs. per sq. in. |
| Alpha gypsum—Rochelle salts composition | 275 lbs. per sq. in. |

*Linear dimensional change in percentage after exposure to steam at 85 pounds pressure and 310° F.*

| | |
|---|---|
| Neat alpha gypsum | 4.4% expansion |
| Alpha gypsum—Rochelle salts mixture | 0.13% expansion |

The dry compressive strength of the alpha gypsum—Rochelle salts composition is over twice that of any fast setting dental stone composition now on the market. The high early strength attained one hour after casting is greatly in excess of strength of any type of competing stone at the same time and enables the dental technician to flask his models much sooner than is possible with other stones. The dimensional change on setting of this mixture is similar to that of several dental stones on the market, while the dimensional change upon exposure to high pressure steam is less than that of most competing stones and as low as any. I have found that models prepared from this improved material above described, possess such strength and hardness, that metal dentures may be prepared by "swaging" directly over such models.

The compositions as above described are also suitable for use in making models for the preparation of celluloid and synthetic resin dentures, and for flasking, articulating and general dental laboratory uses. The compositions may also be used for purposes other than dental models and castings, such as die models, tiles, bricks, etc.

I would state in conclusion that while the described examples constitute a practical embodiment of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. A composition of matter suitable for use in the preparation of dental models, which comprises alpha gypsum, and an amount of Rochelle salt sufficient to substantially overcome the setting-expansion of said alpha gypsum.

2. A composition of matter suitable for use in the manufacture of dental models, which comprises the following ingredients in approximately the proportions named:

| | Per cent |
|---|---|
| Rochelle salt | 1–5 |
| Pigment | 0.5 |
| Retarder | 0.1 |

Alpha gypsum balance.

3. A composition of matter suitable for the production of dental models, which comprises alpha gypsum, at least 1% of Rochelle salt, and a retarder to retard the set of said composition with water.

4. A dental model stone composition, which comprises alpha gypsum and Rochelle salt in proportions suitable for producing a casting with 32% water, having a linear setting expansion of 0.05 to 0.15%.

5. A dental model stone composition, which comprises alpha gypsum and Rochelle salt in proportions suitable for producing a cast with water having a linear expansion of about 0.13% when exposed to steam at 85 pounds per square inch pressure for about three hours.

6. A dental model stone having a compressive strength of approximately 7500 pounds per square inch, consisting of the set reaction product of water and a composition comprising a major portion of alpha gypsum and an amount of Rochelle salt sufficient to substantially overcome the setting-expansion of said alpha gypsum.

MANVEL C. DAILEY.